May 18, 1926.
F. W. LEWIS
SAFETY BRAKE CONNECTION
Filed Jan. 30, 1925
1,584,874
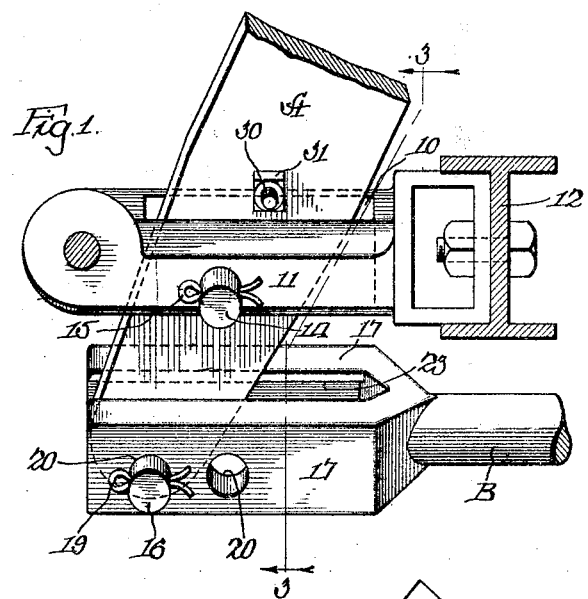
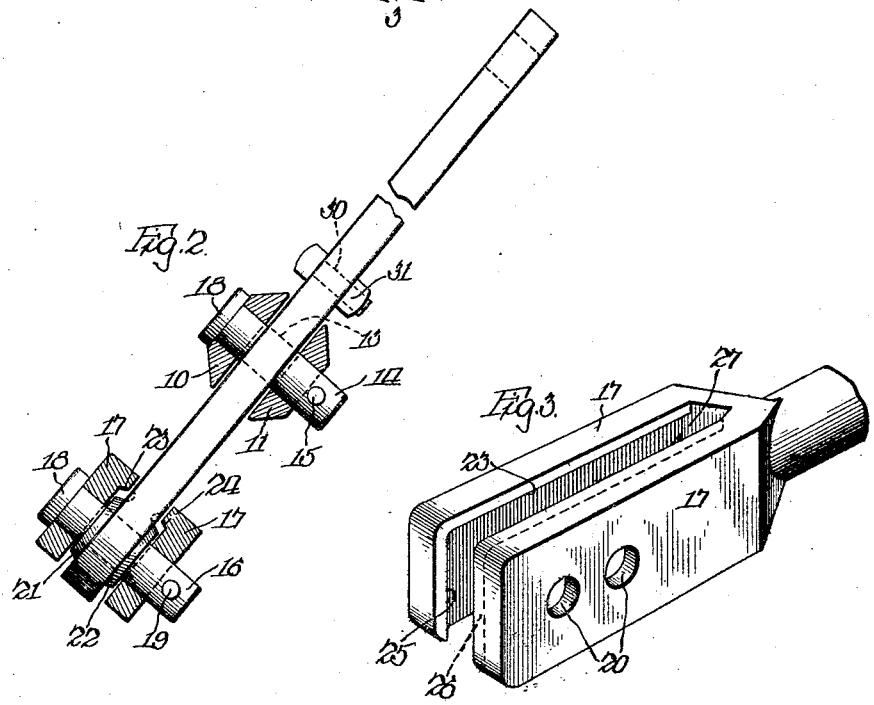
Inventor:
Frank W. Lewis
By George J. Haight
His Atty.

Patented May 18, 1926.

1,584,874

UNITED STATES PATENT OFFICE.

FRANK W. LEWIS, OF DAVENPORT, IOWA.

SAFETY BRAKE CONNECTION.

Application filed January 30, 1925. Serial No. 5,804.

This invention relates to safety brake connections.

In the operation of railroad trains, many dangerous and destructive accidents have occurred due to working loose and consequent loss of the pivot pins ordinarily provided to secure the bottom connecting rods and brake levers together, the accidental disconnection of such pins resulting in dropping of the connection rod onto the track, and should this occur while the train is in motion, which usually is the case, there is danger of derailment, or of the rod piercing the floor of the car and otherwise causing considerable damage. The failure of such connecting pins is caused most frequently by wearing through of the cotters commonly used to secure such pins, the wear being quite rapid due to the constant vibration and movement of the parts.

An object of the invention, therefore, is to provide a connection between the bottom connecting rod of the brake, and the brake lever, which is of such character as to positively prevent the dropping of the bottom rod even though the connecting pin between such rod and brake lever becomes disengaged, and this result is accomplished by the provision of detachably interlocking abutments provided on the bottom rod jaws and brake lever, which retain said members against separation upon accidental removal of the connecting pin, and so arranged that they do not interfere with the operation or adjustment of the parts.

In a lesser degree, the cotter which is used to secure the fulcrum pin of the brake lever in proper position with respect to the brake beam strut, is also subject to wear, with the danger of disconnection of the fulcrum pin, which would result in the dropping of both the bottom rod and the brake lever onto the track; and a further object of the invention is to provide such brake lever with removable means arranged to abut the brake beam strut to prevent the dropping of the brake lever and bottom rod in the event of accidental disengagement of the fulcrum pin.

Other and further objects of the invention will appear more clearly from the description and claims hereinafter following.

Figure 1 is a side elevation of a fragment of a brake lever, brake beam and strut, and a bottom rod pivotally connected with the brake lever, showing my invention in connection therewith; Figure 2 is a front elevation of a brake lever showing the same fulcrumed intermediate its ends in the brake beam strut, indicated in section, the lower portion of said figure corresponding to a transverse section taken on the line 3—3 of Figure 1, and showing the application of the invention, and Figure 3 is a perspective view of the forked portion of a bottom rod constructed in accordance with my invention.

In the drawings, the brake lever is represented generally by the reference character A, and the connecting rod is denoted by the reference character B. The brake lever A is arranged to extend between the spaced side members 10 and 11, of the usual brake beam strut which is suitably connected to the brake beam 12, which also may be of any usual construction, such brake lever being provided with an opening 13 arranged to receive the fulcrum pin 14, which is passed through the side members 10 and 11 of the brake beam strut, said fulcrum pin being provided with a cotter 15 in the usual manner. The upper end of the brake lever A is adapted to be confined in a suitable guide, not shown, in the ordinary manner.

The connecting rod B is arranged to be pivotally secured to the lower end of the brake lever A by means of a pivot pin 16, which extends through the lower end of the brake lever A, and through the forked ends 17 of the connecting rod B, the pivot pin 16 being usually provided with a head 18 arranged to bear against the outer side of one furcation of the forked member 17, and a cotter 19 being extended through the opposite end portion of the pivot pin 16, and arranged to abut against the side of the other furcation of the forked portion of the connecting rod. As shown, the forked portions 17 of the connecting rod B are provided with a plurality of openings 20, through any of which the pivot pin 16 may be extended so as to permit the necessary adjustments between the brake lever A and connecting rod B. It will be appreciated that should the pin 16 become disengaged from the connecting rod and brake lever by reason of the wear or destruction of the cotter pin 19, it is evident that the pivot pin 16 will soon drop out due to the vibration to which the parts are subjected, and the connecting rod B will drop onto the track. In actual practice, such accidental disconnection of the parts is of relatively frequent occurrence, causing considerable damage and delay in the operation of trains.

My invention contemplates means which positively prevent dropping of the connecting rod even though the pivot pin 16 becomes accidentally disengaged. This is accomplished by providing the lower end of the brake lever A with bosses 21 and 22 on the opposite sides thereof, such bosses in the preferred form of construction being annular in form and providing abutments which surround the aperture in the brake lever, through which the pivot pin 16 passes, although such bosses may be disposed in any suitable location as will be appreciated, and one or more may be utilized as desired.

The forked portions 17 of the connecting rod B are also provided with abutments, which are arranged to interengage with the abutments provided by the bosses 21 and 22. The abutments on the forked portion of the connecting rod B are preferably in the form of inwardly disposed ribs 23 and 24, such ribs being arranged to engage the bosses 21 and 22 when the pivot pin 16 is removed from its holding position, the distance between the forked portions of the connecting rod below the abutments 23 and 24 being of sufficient extent to admit the bosses 21 and 22 therebetween. Additional abutments 25 and 26 are provided at the forward ends of the forked portions, such abutments extending downwardly from the abutments 23 and 24, to the bottom of the forked portions, and the rear wall 27 connecting the forked members, provides an abutment at the rear ends of the forked portions, there being no abutments upon the bottom edges of the forked portions, thereby permitting the insertion of the bosses 21 and 22 between the abutments. It will be appreciated that only one boss may be employed on the brake lever, and only one end and top rib employed upon the adjacent forked member if the parts are properly proportioned to fit snugly and this construction may be utilized if deemed desirable.

By this arrangement it will be evident that should the pin 16 become accidentally disengaged, that a slight dropping of the connecting rod will cause the abutments 23 and 24 to engage with the bosses 21 and 22, preventing further downward movement, and that the forward abutments 25 and 26, and connecting wall 27 will prevent detachment of the connecting rod due to longitudinal movement thereof with reference to the bosses 21 and 22. It is also apparent that by the provision of the abutments at the forward and rear ends of the forked portions of the connecting rod on either side of the apertures 20, that relative adjustment of the brake lever with reference to the connecting rod is permitted by disengaging the pin 16 from the forward aperture and engaging the same with the rear aperture, without affecting the operation of the abutments to retain the connecting rod against dropping onto the track when the pivot pin 16 is accidentally disengaged from its position in either of said apertures.

An important advantage of the above described safety device over those commonly used, resides in the fact that the safety means form part of, and are formed integrally with the connecting rod and brake lever, in such a manner that the safety means must be necessarily brought into operation by the mere action of placing the pivot pin in position, requiring no thought or additional effort on the part of the workman in assembling the device, since all that is necessary for him to do is to place the end of the brake lever within the forked position of the connecting rod, and insert the pivot pin. All other safety devices include means which have the serious drawback, in that the safety devices are separately applied, and require care, thought, and additional labor to apply the same, with the consequence that due to haste or carelessness on the part of the workman, such devices frequently fail to perform the function for which they are intended, and when it is considered that any one of such failures might cause a serious accident, the advantage of my construction, necessitating absolutely no thought or care on the part of the workman, and which must be necessarily engaged when the pivot pin is placed in position, becomes clearly apparent.

To prevent the dropping of the brake lever A and connecting rod B should the fulcrum pin 14 become accidentally disengaged from the brake beam strut members 10—11, I provide a removable bolt or pin 30 which extends through the brake lever A, a short distance above the strut, such bolt in this instance being held in position by a suitable nut 31. It will be evident that should the pin 13 become disengaged from the strut, that the slight dropping of the brake lever will bring the bolt 30 into abutment with the sides 10 and 11 of the strut, thereby effectually preventing further dropping of the brake lever and connecting rod onto the track.

While I have herein shown and described what I now consider the preferred manner of carrying out my invention, the same is merely illustrative, and I contemplate all changes and modifications that come within the scope of the claims appended hereto.

I claim:

1. In a device of the character described, the combination with brake operating members; securing means movably connecting said members; and independent means arranged to retain said members against separation in the absence of said securing means.

2. In a device of the character described, the combination with brake operating members; securing means movably connecting said members; and independent means arranged to retain said members against separation in the absence of said securing means, said independent means being in the form of inter-engaging abutments on said members.

3. In a device of the character described, the combination with brake operating members; securing means movably connecting said members; and independent means arranged to retain said members against separation in the absence of said securing means, said independent means being in the form of inter-engaging abutments on said members, said abutments being omitted at certain portions to permit intentional engagement or disengagement of such abutments.

4. In a device of the character described, the combination with brake operating members having a plurality of connecting portions to permit adjustment of said members relative to each other; securing means adjustably engageable with said connecting portions for movably connecting said members; and independent means arranged to retain said members against separation in the absence of said securing means, said independent means being in the form of inter-engaging abutments disposed in position to operate in the various adjusted positions of said brake members.

5. In a device of the character described, the combination with brake operating members, one of said members having a forked portion and the other of said members having a portion adapted to be disposed between the furcations of said forked member; and inter-engaging abutments on said members arranged to retain the same against separation in all directions, except in a direction substantially opposite to a force acting to retain said abutments in engagement.

6. In a device of the character described, the combination with a brake lever and connecting rod of a brake, said connecting rod having a forked portion adapted to receive a portion of said brake lever therein; a connecting pin for pivotally securing said members together; bosses formed on said brake lever; and abutments formed on the inner faces of said forked member, said abutments being arranged to coact with said bosses to prevent separation in the absence of said connecting pin.

7. In a device of the character described, the combination with a brake lever and connecting rod of a brake, said connecting rod having a forked portion adapted to receive a portion of said brake lever therein; a connecting pin for pivotally securing said members together; bosses formed on said brake lever and abutments formed on the inner faces of said forked member, said abutments being arranged to coact with said bosses to prevent separation in the absence of said connecting pin, said forked portion being provided with a plurality of openings for adjustable reception of said connecting pin, said abutments being arranged to permit relative adjustment between the connecting rod and brake lever without becoming inoperative.

8. In a device of the character described, the combination with a brake lever and supporting strut; a connecting rod connected to said brake lever; an abutment secured to said brake lever above said strut in position to engage the same should said fulcrum pin become accidentally disengaged; and abutments on the lower end of said brake lever adapted to inter-engage with abutments on related portions of said connecting rod.

9. In a safety device of the character described, the combination with two elements pivotally connected together, said pivotal connection normally preventing one of said elements from falling under the influence of gravity, one of said elements being forked, and the other of said elements disposed between the forked portions of said first element, said elements having on adjacent opposed faces cooperable projections so arranged that upon removal of the pivot connection, said projections engage to prevent the separation of one of said elements from the other.

10. In a device of the character described, the combination with two members having means adapted to provide a pivotal connection therebetween; of safety means comprising inter-engaging abutments on said members so arranged that they are operatively engaged by placing said members in position to connect said pivot means.

11. As an article of manufacture, a brake connecting rod having a forked portion provided with safety abutments including inwardly extending ribs disposed adjacent certain edges of the forked members to restrict the opening therebetween.

12. In a device of the character described, the combination with brake operating members; securing means movably connecting said members; and independent means arranged to retain said members against separation in the absence of said securing means, said independent means being disposed in spaced relation while said securing means are in position and connecting said members.

13. In a device of the character described, the combination with a brake lever and connecting rod; securing means movably connecting said members; and independent means arranged to retain said members against separation in the absence of said securing means, said independent means being in the form of inter-engaging abutments.

In witness that I claim the foregoing I have hereunto subscribed my name this 27th day of January, 1925.

FRANK W. LEWIS.